United States Patent [19]
Monnier

[11] Patent Number: 5,960,768
[45] Date of Patent: Oct. 5, 1999

[54] ARRANGEMENT OF A DIRECT-INJECTION AND SPARK-IGNITION 4-STROKE INTERNAL-COMBUSTION ENGINE

[75] Inventor: Gaëtan Monnier, rue Paul Cézanne, France

[73] Assignee: Institut Francais du Petrole, Rueil-Malmaison cedex, France

[21] Appl. No.: 09/084,253

[22] Filed: May 26, 1998

[30] Foreign Application Priority Data

May 29, 1997 [FR] France .................................. 97 06731

[51] Int. Cl.$^6$ ....................................................... F02B 17/00
[52] U.S. Cl. ........................... 123/298; 123/305; 123/295
[58] Field of Search ................... 123/295, 305, 123/298

[56] References Cited

U.S. PATENT DOCUMENTS

| | | | |
|---|---|---|---|
| 2,483,288 | 9/1949 | Malin | 123/32 |
| 2,803,229 | 8/1957 | Schwaiger | 123/279 |
| 3,504,681 | 4/1970 | Winkler | 123/279 |
| 4,522,173 | 6/1985 | Agache | 123/295 |
| 4,641,617 | 2/1987 | Aoyama et al. | 123/262 |
| 4,920,937 | 5/1990 | Sasaki et al. | 123/298 |
| 4,982,708 | 1/1991 | Stutzenberger | 123/298 |
| 5,127,379 | 7/1992 | Kobayashi et al. | 123/305 |
| 5,735,240 | 4/1998 | Ito et al. | 123/295 |
| 5,749,334 | 5/1998 | Oda et al. | 123/305 |
| 5,775,288 | 7/1998 | Suzuki et al. | 123/298 |

FOREIGN PATENT DOCUMENTS 0412009 2/1991 European Pat. Off. .
0558072 9/1993 European Pat. Off. .

*Primary Examiner*—Erick R. Solis
*Attorney, Agent, or Firm*—Antonelli, Terry, Stout & Kraus, LLP

[57] ABSTRACT

A direct-injection and spark-ignition 4-stroke internal-combustion engine having at least one combustion chamber (1) including a piston (2), a cylinder (3), a cylinder head (4), several intake lines (5) associated with intake elements (6), an exhaust line (9) cooperating with an exhaust valve (11), and an ignition device (7) positioned close to intake elements (6). The upper face of the piston (2) has a profile close to that of the lower face of the cylinder head (4), and the piston (2) has a recess (12) in the vicinity of the area into which ignition device (7) opens. A fuel injection element (8) is positioned in the vicinity of the ignition device (7), and one of the intake elements (6) has a longitudinal axis close to the longitudinal axis of the cylinder (XX').

6 Claims, 2 Drawing Sheets

5,960,768

ARRANGEMENT OF A DIRECT-INJECTION AND SPARK-IGNITION 4-STROKE INTERNAL-COMBUSTION ENGINE

FIELD OF THE INVENTION

The present invention relates to the field of spark-ignition 4-stroke internal-combustion engines, particularly with direct fuel injection in the combustion chamber.

In this type of engines, fuel is injected directly into the combustion chamber and not in the intake line(s) as in other engines. Direct fuel injection allows better control of the combustion insofar as the injectors can react and be controlled at the level of the engine cycle.

BACKGROUND OF THE INVENTION

Many engines have already been designed along the same lines. Thus, there are spark-ignition 4-stroke engines having 4 valves per cylinder, a plug placed in the cylinder head on the longitudinal axis of the cylinder having oriented intake ducts and ending up substantially parallel to the axis of the cylinder, where the fuel injector ends up just below the intake valves.

There are also well-known engines of this type wherein the intake lines are however oriented so as to produce a motion of the gas around the axis of the cylinder (a motion known as swirl).

The piston associated with these engines commonly exhibits a recess of specific shape intended to orient and to reinforce the motion of the gas in the combustion chamber.

Also known are engines whose piston comprises a spherical bowl (or recess) placed, at the top dead center, just opposite the fuel injection and the spark plug.

All these engines have large cylinder capacities (cylinder bores above 80 mm) and they all have at least four valves per cylinder.

They allow stratified combustion at low loads and/or homogeneous combustion at high loads.

The combustion is referred to as stratified when a zone of the combustion chamber contains a richer mixture than the rest of the chamber at low loads. This allows the mixture to be more readily ignited since the enriched zone is in the vicinity of the plug.

A combustion referred to as homogeneous is recommended at high loads. A highly homogeneous mixture is thus sought throughout the combustion chamber.

Direct-injection engines currently run properly with either one mode or the other. It is generally difficult to reconcile the two methods of operation.

SUMMARY OF THE INVENTION

The present invention relates to the type of engines described above and allows some of the associated problems to be solved.

More precisely, the present invention allows reduction of the fuel consumption by means of a decrease in pumping work. Furthermore, the heat transfer in and around the combustion chamber is highly reduced according to the present invention.

The present invention specifically relates to stratiflied-combustion direct-injection engines with small-size cylinders.

The object of the present invention is thus to provide a direct-injection and spark-ignition 4-stroke internal-combustion engine comprising at least one combustion chamber delimited by a piston, a cylinder and a cylinder head, several intake lines each associated with an intake element, an exhaust line co-operating with an exhaust valve, an ignition means placed in the vicinity of the intake valves, the upper face of the piston exhibiting a profile close to that of the lower face of the cylinder head and the piston comprising a recess in the vicinity of the area into which the ignition element opens.

According to the invention, the engine further comprises a fuel injection element placed in the vicinity of the ignition means, at least one of the intake elements has a longitudinal axis close to the longitudinal axis of the cylinder.

The fuel injection element is specifically placed below the ignition means.

Furthermore, the intake lines are arranged and open symmetrically opposite a plane of symmetry which further contains the longitudinal axis of the exhaust line.

The ignition means can be advantageously placed on or close to the plane of symmetry.

Further, the injection element is placed on or in the immediate vicinity of the plane of symmetry.

Without departing from the scope of the invention, the recess in the piston exhibits a spherical or semi-spherical shape.

BRIEF DESCRIPTION OF THE DRAWINGS

Other features, advantages and details of the invention will be clear from reading the description hereafter, given by way of non limitative example, with reference to the accompanying drawings wherein.

DETAILED DESCRIPTION OF THE INVENTION

Figure 1:
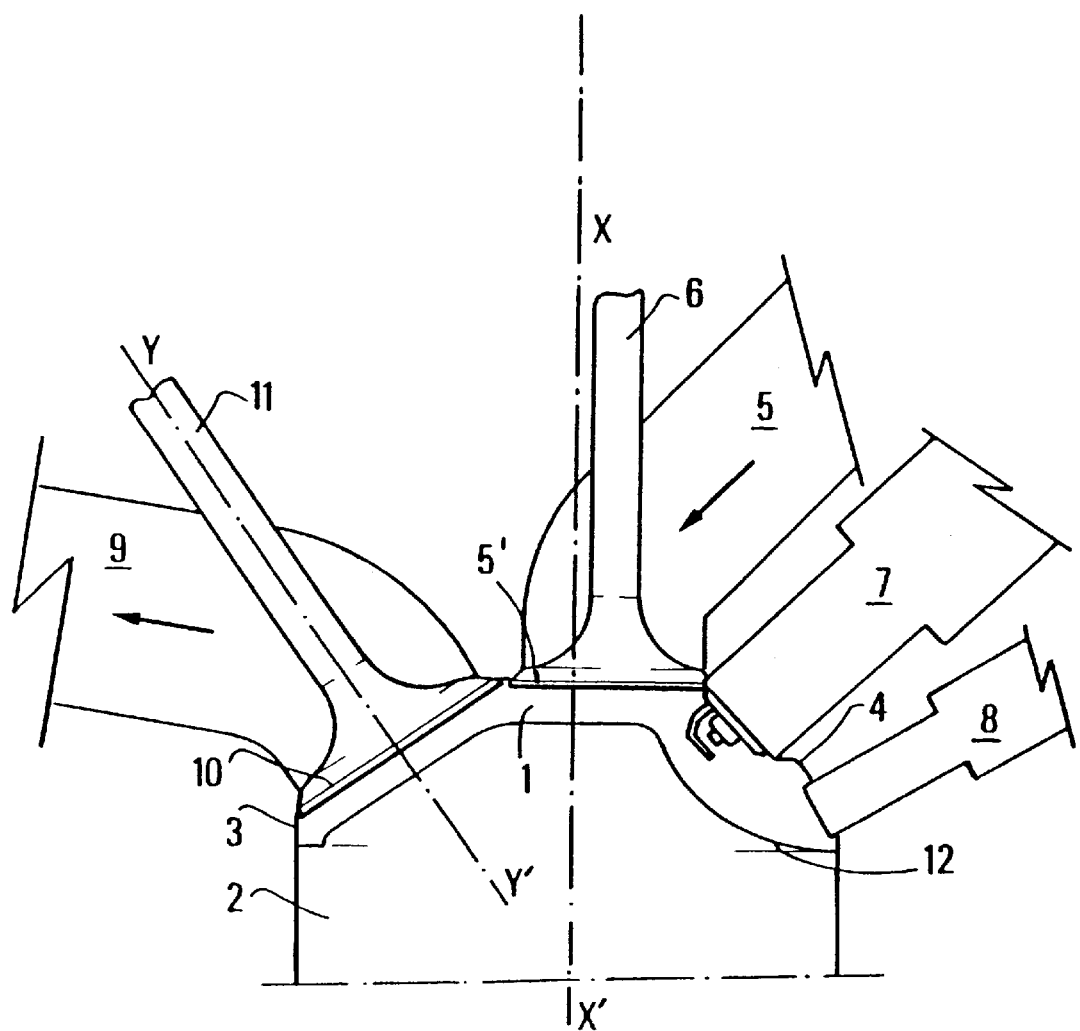
FIG. 1 is a simplified longitudinal section of an embodiment of the invention.

The longitudinal section of the upper part, on the cylinder head side, of a cylinder according to the invention is schematized in FIG. 1.

The elements necessary for the invention are represented therein : combustion chamber 1 is delimited, as it is well-known in the art, by the upper face of piston 2, cylinder 3 and cylinder head 4.

There are two intake ports 5' and two intake lines 5, only one of each being represented in the section of FIG. 1. The axes of intake valves 6 are substantially parallel to the longitudinal axis of the cylinder XX'. The two intake ports 5' and two intake lines 5 are preferably disposed symmetrically with respect to a plane referred to as the "mid-plane" (section plane of FIG. 1).

An ignition means such as a plug 7 and a fuel injector 8 are placed in this plane or in proximity thereto. These two elements are preferably placed below intake lines 5 if we consider that the "top" of the cylinder is on the cylinder head side and the "bottom" on the crankcase side. Plug 7 is rather placed above injection element 8, i.e. closer to the intake lines 5 and ports and to the centre of the combustion chamber.

As for the exhaust, line 9, port 10 and valve 11 are placed in or around the mid-plane, on the side opposite the intake.

The axis YY' of line 9 and that of valve 11 merge in the vicinity of the cylinder; this axis YY' is rather inclined with respect to that of the cylinder XX'.

Figure 3:
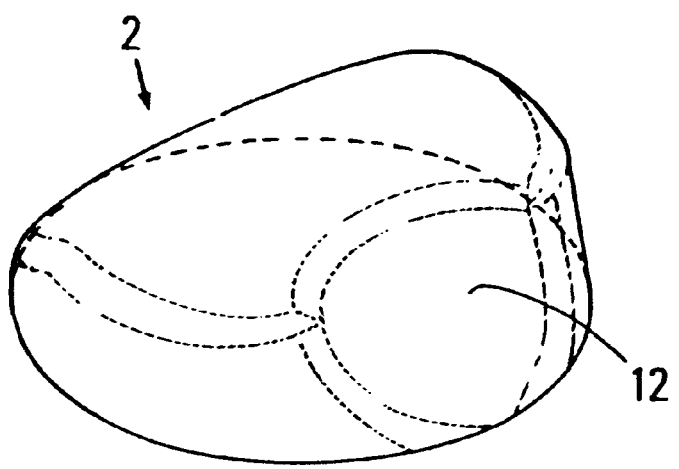
FIG. 3 illustrates a recess in the piston of the engine of the invention.

Furthermore, the upper face of piston 2 exhibits a profile close to that of the lower face of cylinder head 4 so that, at the top dead center, there is a clearance (or gap) of only some millimeters between these two surfaces. Furthermore, in the vicinity of the area of chamber 1 into which plug 7 and injector 8 open, piston 2 exhibits a recess 12 (FIG. 3) intended to improve the internal aerodynamics of the gas in combustion chamber 1.

Figure 2:
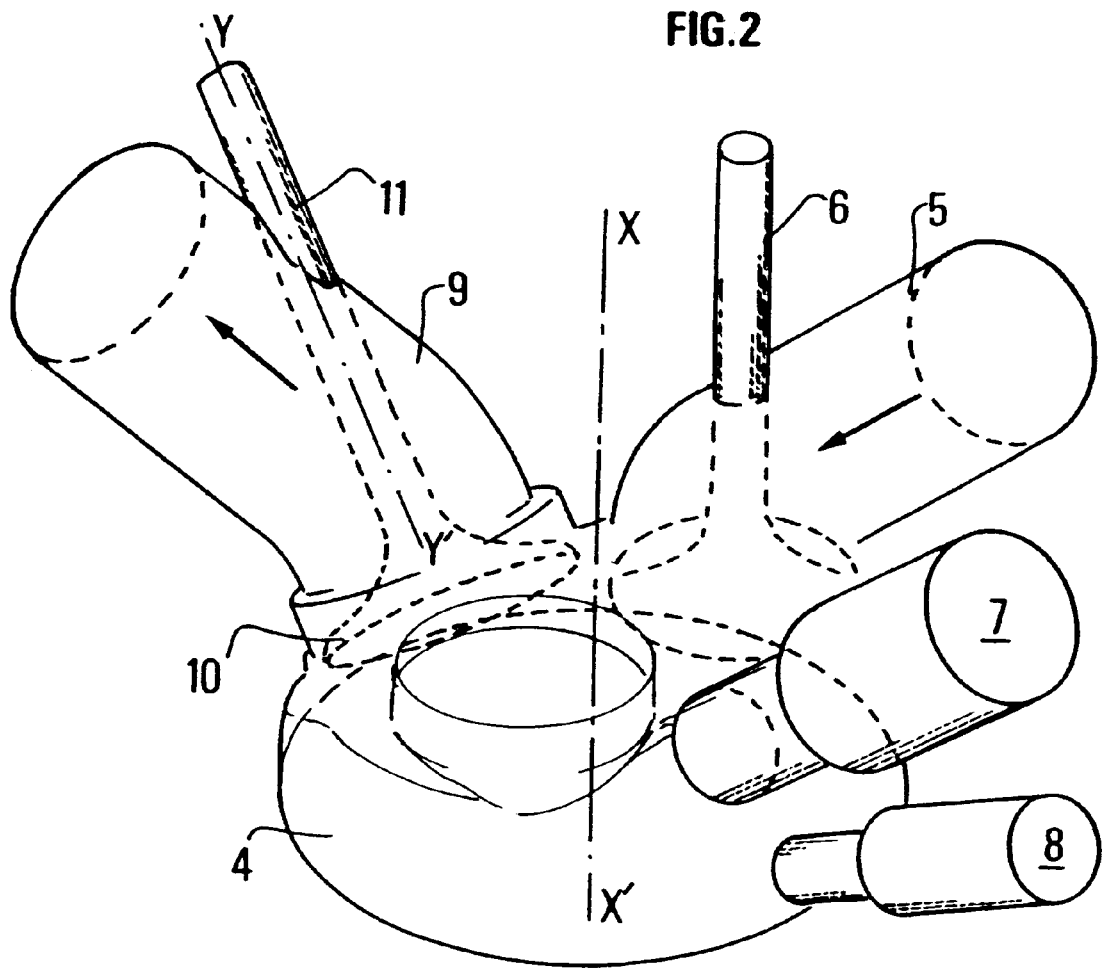
FIG. 2 is a perspective exploded view of the cylinder head and of the upper part of combustion chamber.

FIG. 2 illustrates more in detail the arrangement described above. Only one intake (line 5, valve 6 and port bearing no reference number) is shown in this exploded view.

It clearly appears that plug 7 and injector 8 are in the mid-plane and that the intakes are situated on either side of this plane.

FIG. 2 also shows that piston 2 has a recess 12 on the side of plug 7 and injector 8.

The arrangement according to the invention described above allows a real improvement in the movement of the gas in combustion chamber 1, notably with small cylinders where space requirements are a real constraint. This arrangement allows the fresh air to flow readily and directly into the combustion chamber and to become properly mixed with the fuel injected in proximity just below.

The permeability of a three-valve cylinder is thus improved.

Injector 8 being placed in the mid-plane, the jet produced does not break any wall; it can thus extend and widen without any problem. This is favourable with homogeneous running where the fuel must be well distributed throughout the volume of chamber 1.

In the case of a stratified combustion running, the injection jet can be discharged onto piston 2 so as to produce the fuel stratification in the vicinity of plug 7.

In a particularly advantageous way, plug 7, injector 8 and intake lines 5 are placed near the front of the vehicle where they can be rapidly and readily removed.

Furthermore, injector 8 is not placed opposite plug 7, which increases the life and the resistance of these two components.

I claim:

1. A direct-injection and spark-ignition 4-stroke internal-combustion engine comprising:

a cylinder, a piston within the cylinder and having an upper face, and a cylinder head on the cylinder and having a lower face, the piston, cylinder, and cylinder head cooperating to define a combustion chamber having at least one intake port and an exhaust port, the at least one intake port adapted for connection to an intake line for introduction of air into the combustion chamber, the exhaust port adapted for connection to an exhaust line for exhaust of combustion gases from the combustion chamber;

at least one intake valve having a longitudinal axis close to the longitudinal axis of the cylinder, for controlling flow of air through the at least one intake port;

an exhaust valve for controlling flow of combustion gases through the exhaust port;

an ignition element in the vicinity of the at least one intake port; and a fuel injection element in the vicinity of the ignition element, the piston upper face having a profile close to the profile of the cylinder head lower face, but with a recess in the vicinity of the ignition element.

2. An engine as claimed in claim 1, wherein the ignition element is closer to the at least one intake port than is the fuel injection element.

3. An engine as claimed in claim 1, wherein there are two intake ports, the two intake ports being disposed symmetrically with respect to a plane containing the the exhaust valve, the ignition element, and the fuel injection element.

4. An engine as claimed in claim 3, wherein the ignition element is disposed on or in immediate proximity to the plane of symmetry.

5. An engine as claimed in claim 3, wherein the injection element is disposed on or in immediate proximity to the plane of symmetry.

6. An engine as claimed in claim 1, wherein the recess in the piston upper face has a spherical or semi-spherical shape.

* * * * *